Jan. 20, 1970  R. J. ORANCZAK  3,490,386
MEANS FOR PREVENTING SKIDDING OF TRUCKS
IN MATERIALS HANDLING SYSTEMS
Filed Dec. 6, 1966  3 Sheets-Sheet 1

INVENTOR
RONALD J. ORANCZAK
BY Seidel & Gonda
ATTORNEYS.

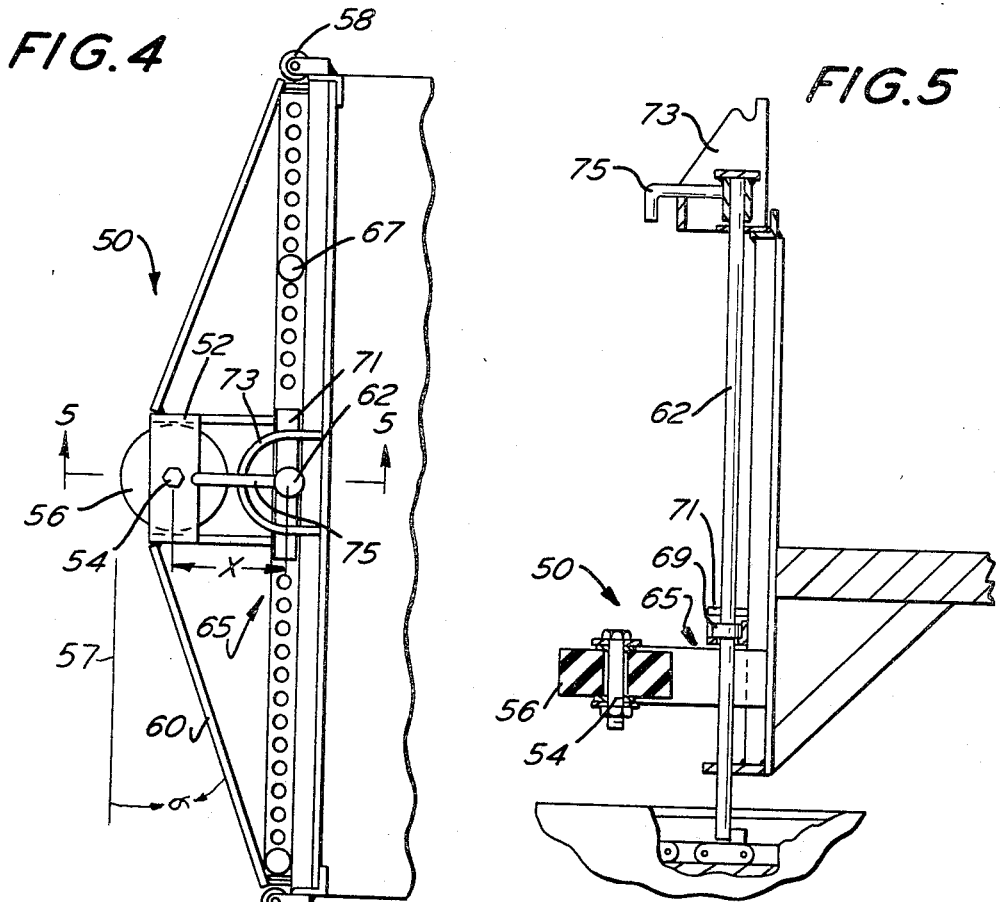
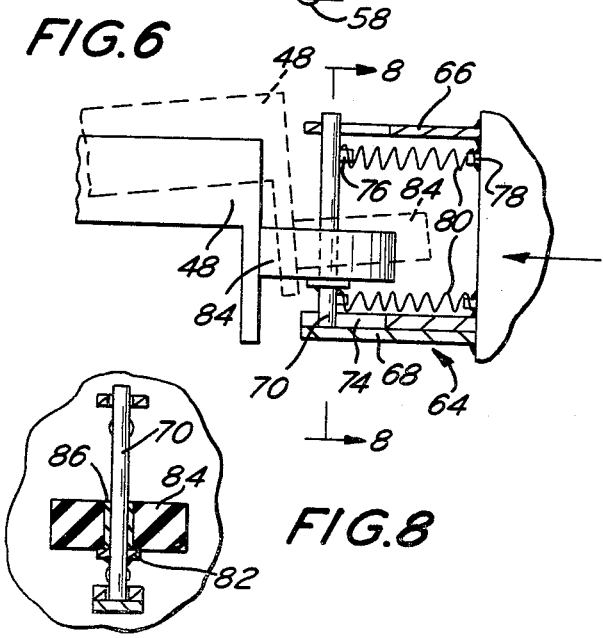
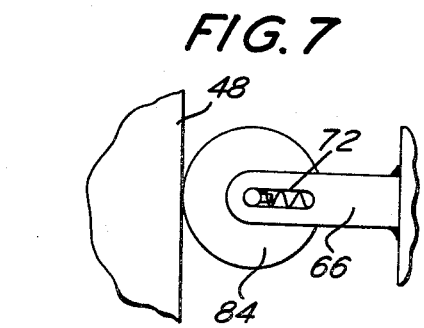
INVENTOR
RONALD J. ORANCZAK
BY
ATTORNEYS.

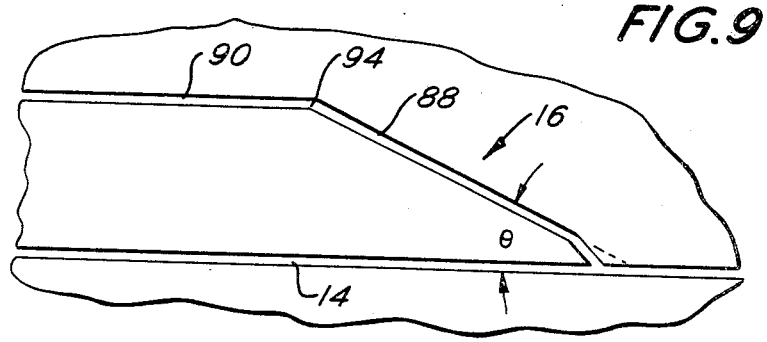
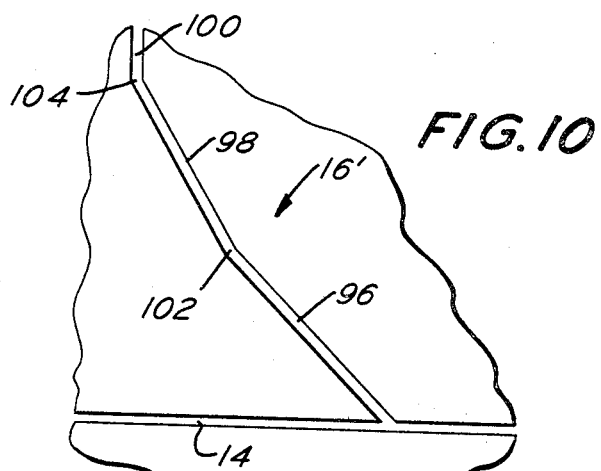
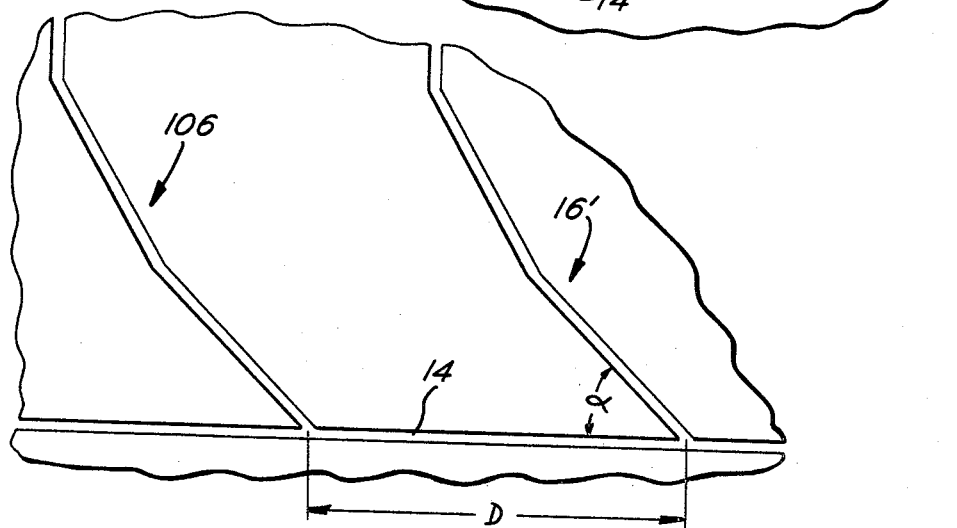

United States Patent Office 3,490,386
Patented Jan. 20, 1970

1

3,490,386
MEANS FOR PREVENTING SKIDDING OF TRUCKS
IN MATERIALS HANDLING SYSTEMS
Ronald J. Oranczak, Allentown, Pa., assignor to S.I.
Handling Systems, Inc., Easton, Pa., a corporation of
Pennsylvania
Filed Dec. 6, 1966, Ser. No. 599,473
Int. Cl. B61c 11/02; B61b 13/00
U.S. Cl. 104—178                                    17 Claims

ABSTRACT OF THE DISCLOSURE

The disclosure deals with material handling systems which include material-carrying trucks guided by a track and provided with a bumper designed to minimize skidding of the truck. The track comprises a main slot, and the shunt slots are so configurated that the pushing force exerted by the driven truck on a preceding truck approximates the direction of the shunt slot at the moment the driven and preceding trucks become disengaged. In two different slot configurations, the shunt slots ultimately extend parallel to the main slot and away from the main slot at right angles thereto. The trucks are provided at their front ends with a roller mounted on a generally vertical axis, so that the pushing force exerted on the preceding truck passes through the axis. Another aspect of the present disclosure concerns spacing of successive shunt slots so that no more than one preceding truck will be pushed into a shunt slot at any given time.

This invention relates to means for eliminating skidding in materials handling systems. More particularly, this invention relates to track and truck bumper configurations whereby skidding of trucks in materials handling systems may be eliminated.

In one well-known form of tow truck system, the track comprises a main slot and numerous shunt slots branching from the main slot and is embedded in a floor. A conveyor, which may take the form of a tow chain, rides within the main slot. Tow trucks, including tow pins at their front ends, rest on the floor. The tow pins extend downwardly into the slots. Thus, when following the main slot, such trucks are driven by the conveyor therein. Contact between the tow pins and the sides of the slots provide directional control for the trucks.

With such a system, selected trucks may be diverted from the main slot, as for example, by the means shown in Patents 3,094,944 and 3,174,439, assigned to the assignee of the present application.

A difficulty experienced with systems of the foregoing type manifests itself upon initial contact between the pushing truck and the truck entering the shunt slot. Thus, in prior art systems, initial contact between the rear of the truck entering the shunt slot and the pushing truck is usually at the corner of the bumper of the pushing truck. Such initial contact applies to each of the trucks an off-center force. This usually occurs with considerable impact, and the force, acting through a moment arm around the tow pin, is often large enough to overcome the friction forces of the truck wheels. As a result, the pushing truck, and often, the pushed truck as well, skids about its tow pin as a center.

Further skidding, which may be called for the purpose of this disclosure, secondary skidding, often occurs after initial impact, while the trucks are in motion. Such skidding is likewise due to applications of off-center line loads to the trucks.

Accordingly, it is an object of the present invention to overcome the problem of skidding of trucks in materials handling systems.

2

It is another object of the present invention to provide novel slot and truck configurations whereby the moment arm of impacting forces between a pushing truck and a pushed truck will be eliminated or at least minimized.

It is yet another object of the present invention to provide a tow truck system wherein slot and bumper configurations cooperate to substantially eliminate skidding.

Other objects will appear hereinafter.

One form of a means for accomplishing the above objects includes a truck having a central forwardly disposed bumper portion and further bumper portions disposed laterally and rearwardly of the central portion. Also, the spur is so configured and of such length that the direction of force applied by the bumper portions to a preceding truck approximates the direction of the slot just before the pushing means becomes disengaged from the transversely extending portion.

For the purpose of illustrating the invention, there are shown in the drawings forms which are presently preferred; it being understood, however, that this invention is not limited to the precise arrangements and instrumentalities shown.

FIGURE 4 is a partial top plan view of a bumper configuration in accordance with the present invention.

FIGURE 5 is a cross-sectional view taken along the line 5—5 in FIGURE 4.

FIGURE 6 is a detail view, partially in section, showing a particular means for mounting a central roller in accordance with the present invention.

FIGURE 7 is a top view of the structure shown in FIGURE 6.

FIGURE 8 is a cross-sectional view taken along the line 8—8 in FIGURE 6.

FIGURE 9 is a top plan view of a spur in accordance with the present invention, and running generally parallel to the main slot.

FIGURE 10 is a top plan view of a spur in accordance with the present invention, and running generally perpendicular to the main slot.

FIGURE 11 is a top plan view of a pair of spurs similar to that shown in FIGURE 10, and spaced in accordance with the principles of the present invention.

Figure 1:
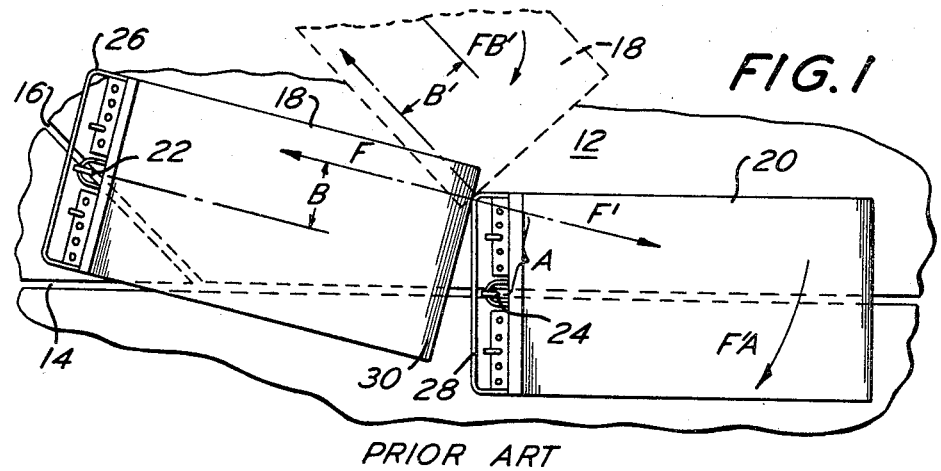
FIGURE 1 is a top plan view showing the manner in which a typical prior art pushing truck contacts a preceding truck as the preceding truck enters a spur.

Referring now to the drawings in detail, wherein like numerals indicate like elements, there is seen in FIGURE 1 a portion of a materials handling system, which comprises a floor 12, a main slot 14 in the floor 12, and a spur 16 in communication with and extending away from the main slot. Wheeled trucks 18 and 20 rest on the floor 12, and include tow pins 22 and 24, respectively, at their front ends. The truck 18 also includes at its front end a bumper 26. A similar bumper 28 is disposed at the front end of the truck 20. The tow pin 24 of the truck 20 may be in engagement with a moving tow chain, not shown, disposed in the main slot 14. Alternatively, the truck 20 may be self-propelled.

A study of FIGURE 1 reveals one aspect of the problem to which the present invention is directed. Thus, assuming that FIGURE 1 depicts the instant of initial contact between the truck 20 and the truck 18, the truck 20 is seen to be exerting a force F on a rear portion 30 of the truck 18. The direction of the major component of force F is parallel to the direction of motion of the truck 20, which is, of course, not the same as the direction of motion of the truck 18. An equal and opposite force F' is exerted on the truck 20, rearwardly from the point of contact of the bumper 28 and the rear portion 30 of the truck 18. The force F', acting on a moment arm A from the tow pin 24 creates a counterclockwise moment F'A about the tow pin. If, as is often the case, the moment F'A is large enough to overcome moments due to friction forces of the truck wheels, the truck 20 skids in a clockwise direction.

Skidding of the truck 18 at impact does not generally occur. However, the truck 18 can skid in a clockwise direction when the truck 20 has pushed the truck 18 most of the way into the spur. See the dotted line portions in FIGURE 1, and note the size of moment FB'.

Figure 2:
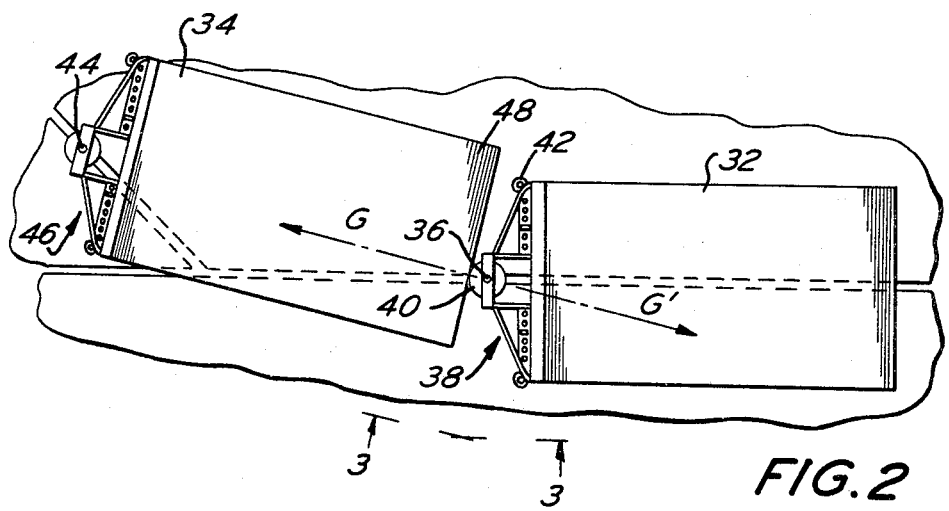
FIGURE 2 is a top plan view showing a truck in accordance with the present invention pushing a preceding truck into a spur.
Figure 3:
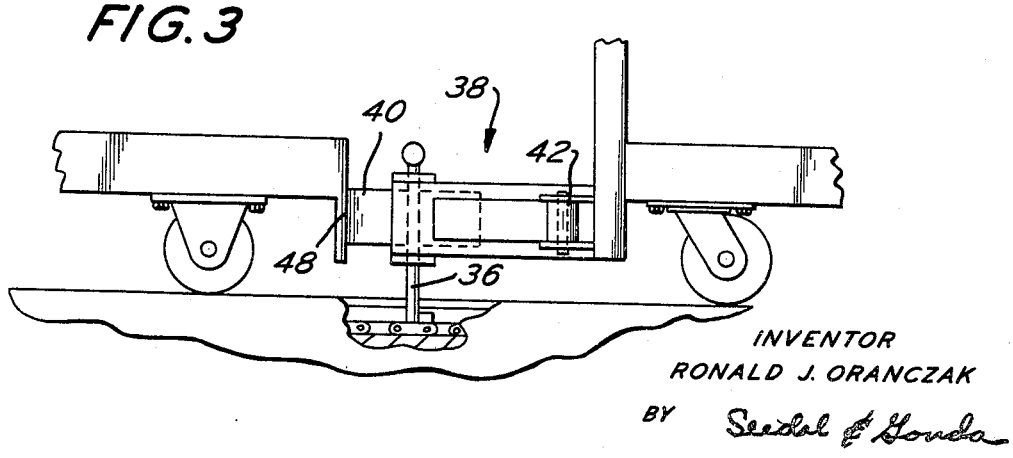
FIGURE 3 is a detail view taken along the line 3—3 in FIGURE 2, and showing a particular arrangement of a central roller and tow pin.

Referring now to FIGURE 2, there are seen truck 32 and 34 constructed in accordance with the principles of the present invention. Thus, the truck 32 includes a tow pin 34 and a push bumper 38 at its front end. The push bumper 38 includes a central portion in the form of a roller 40, disposed for rotation about a generally vertical axis. As is perhaps best seen in FIGURE 3, the tow pin 36 may provide the axis about which the roller 40 rotates. The push bumper 38 further includes further portions exemplified by the side rollers 42, defining forward edge portions of the truck. The side rollers 42 are disposed laterally and rearwardly of the central rollers 40 so that a line drawn between the central roller 40 and a side roller 42 forms an angle of at least twenty degrees with a line defining the width of the truck. In a preferred form of the invention, the side rollers 42 are disposed laterally and rearwardly of the central roller at an angle of twenty-two degrees. The truck 34 includes a tow pin 44 and bumper 46 similar in all respects to those of the truck 32.

The truck 32 exerts a pushing force G on the truck 34. Also, a reaction force G' is exerted on the track 32. Since, however, the reaction force G' acts directly through the tow pin 36, it creates no moment about the pin, and hence, the skidding tendency of the pushing truck is substantially eliminated. Moreover, the line of action of the force G is normal to the rear portion 48 of the truck 34, since it is applied to the rear portion through a rolling connection. Such line of action closely approximates the instantaneous direction of motion of the truck 34, and is much closer to the direction of the spur than is force F in FIGURE 1. Consequently, the tendency of the tow pin 44 to act as a fulcrum for rotational skidding of the truck 34 is substantially reduced, and a greater portion of the applied force is available to move the truck.

Referring to FIGURES 4 and 5, there is seen another form of push bumper incorporating principles of the present invention. The push bumper 50 in these figures includes a support structure 52. Secured to the support structures 52 is an axle 54. A central roller 56 is rotatably mounted on the axle 54. Side rollers 58 are disposed at either extreme of the bumper, and bars 60 extend from the support structure 52 to a point adjacent the side rollers 58. It should be understood that the bars 60 are disposed behind a line drawn between surfaces of the central roller 56 and the side rollers 58, and thus, contact with a pushing truck is made, in the ordinary case, by the rollers rather than the bars. Thus, a rolling contact is assured. The tow pin 62 is secured to the truck behind the central roller 56. The tow pin 62 is of conventional structure, as is the rest of the truck. Thus, the bumper 50 may be applied to existing trucks, thereby adapting them to partake of the advantages of the present invention. In constructions in accordance wih FIGURES 4 and 5, a moment may be created about the tow pin 62, but such moment will in any case be far smaller than the moment F'A.

The disposition of the side rollers 58 with respect to the central roller 56 is similar to that set forth in connection with the bumper 36. Thus, the side rollers 58 are spaced laterally and rearwardly of the central roller 56 at an angle of at least 20°. A preferred angle is 22°. In other words, a traverse line 57 forms an angle of at least about 20° with said above-mentioned line extending between rollers 56 and 58. See FIGURE 4.

A further feature of the construction in accordance with FIGURES 4 and 5 is the selector pin support means denoted generally by the reference numeral 65. Thus, in systems of the type presently disclosed, selector pins such as pins 67 depend from the support 65 and may contact floor-mounted means to cause switching of trucks from the main slot to selected spurs. The operation of such pins is more fully set forth in U.S. Patent 3,103,895, assigned to the assignee of the present invention. The support means 65 includes a raised central bracket portion 71 through which tow pin 62 extends. A collar 69 is secured to the tow pin 62 below the bracket portion 71. Thus, raising of the tow pin 62 causes contact between the collar 69 and the bracket 71, and lifting of the support means 65. In the raised position of the support means, the selector pins 67 cannot contact the floor-mounted means, and the tow pin 62 is out of engagement with the slot. Accordingly, the truck may be moved in any desired direction independently of the slots. A latch plate 73 cooperates with a handle 75 to maintain the tow pin in its raised position.

The spacing between the axle 54 of the central roller 56, denoted in FIGURE 4 by the letter X, should be minimized in order to minimize moments about the tow pin 62 due to pushing forces. The distance X for a given truck size is a function of the truck width, the angle at which the side rollers 58 are disposed with respect to the central roller 56, and the size of the roller 56.

A further modification of a bumper in accordance with the present invention is set forth in FIGURES 6 and 8. In this modified form, a support structure 64, which comprises brackets 66 and 68, supports an axle 70. The bracket 66 includes an elongated slot 72. The slot 72 receives an upper end of the axle 70. The bracket 68 includes an elongated blind slot 74. A lower end of the axle 70 is retained in the slot 74. Upper and lower anchor studs 76 extend rearwardly from the axle 70. Anchor studs 78 are fixed in juxtaposition to the anchor studs 76. Compression springs 80 extend between the fixed portions of the support 64 or the front portion of the truck and the axle 70. The anchor studs 76 and 78 are concentric with the ends of the springs, and retain them in a fixed position.

Also secured to the axle 70 is a collar 82. As is best seen in FIGURE 8, a central roller 84, which may include a bushing 86, is slidably and rotatably mounted on the axle 70. A collar 82 serves as a lower limit stop for the roller 84.

The modification shown in FIGURES 6 to 8 is especially useful in cases where an empty truck is used to push a loaded truck or series of trucks into a spur. In such situations, the inertia of the pushed trucks has been known to cause instantaneous lifting of the last pushed truck. Such lifting, transferred by frictional engagement to the front of the pushing truck, causes the pushing cart to "free" itself from the drive chain, thereby causing failure of the pushing cycle. The structure of FIGURES 6 to 8 prevents such mishaps. Thus, in the first instance, yielding of the springs 80 lengthens the time of impact, and reduces the likelihood of raising of the rear end of the pushed truck. Moreover, should the rear end of the truck rise, rather than transmit an upward force to the front of the pushing cart, the central roller 84 will ride up the axle 70. In this regard, see the dotted line portions in FIGURE 6.

Turning now to FIGURE 9, there is seen a novel spur configuration which forms a part of the present invention. The spur, designated generally by the reference numeral 16, branches off the main slot 14, and ultimately extends parallel to the main slot. The spur 16 includes a diverter segment, not numbered, a first spur segment 88, and a second spur segment 90. The diverter segment, it should be understood, is relatively short, on the order of 18 inches. Such length is considerably shorter than the length of the truck, and merely insures positive switching from the main slot 14 to the spur. For the purposes of analysis and definition of the invention, the diverter segment may be overlooked. A turn section 94 joins the first and second spur segments. The angle θ at which the first spur segment 88 extends away from the main slot 14 is a matter of choice, but since the spur 16 ultimately runs parallel to the main slot 14, it has been found best to minimize the angle θ. A suitable angle has been found to be the angle whose tangent is the width of the truck divided by its overall length. The length of the first spur segment 88 should be such that the direction of the force applied by the pushing truck approximates the direction of the first segment just before the pushing means becomes disengaged from the rear of the pushed truck. Also, with spurs of the type shown in FIGURE 9, it is preferable that the tow pin of the pushed vehicle not reach the turn section 94 before disengagement of the pushing truck. This is so because the line of action of the applied pushing force just prior to disengagement is such that potential skid-producing moments are maximized. Turning of the truck at this moment tends to bring on secondary skidding.

Turning now to FIGURE 10, there is seen a spur 16′ in accordance with the principles of the present invention. The spur 16′ may be referred to as a perpendicular spur, since its ultimate direction is generally at right angles to the direction of the main slot 14.

The spur 16′ includes a first spur segment 96 in communication with the main slot 14, a second spur segment 98, and a third spur segment 100. A first turn section 102 joins the first and second spur segments. A second turn section 104 joins the second and third spur segments. The length of the first spur segment is such that the direction of force applied by a pushing truck following the main slot to a truck in the spur approximates the direction of the segment 96 just before disengagement of the truck. Also, in the case of perpendicular spurs, unlike parallel spurs, it has been found desirable to have the tow pin of the pushed truck pass the first turn section just before disengagement of the trucks. Such an arrangement minimizes the effect of skid-producing moments in spurs of this type by reducing the tendency of the tow pin to act as a fulcrum for swinging of the truck. Similar considerations determine the length of the second spur segment 98.

A further anti-skid feature of the spur 16′ resides in the relative size of the angles of deflection of the first turn section 102 and the second turn section 104. It has been found advantageous to have the angle of deflection of the first turn section 102 less than that of the section turn segment 104. Thus, in one suitable construction, the initial turn-off, that is the angle between the first spur segment and the main slot was, 45°; the first turn section 15°; and the second turn section 30°. Such an arrangement is occasioned by the fact that trucks far into the spur are apt to be partially unloaded, and hence, lighter. It has been found that skidding is more likely when heavily loaded trucks are made to negotiate large turning angles. Accordingly, the least heavily loaded of the trucks in the spur are made to turn through the largest angle.

Referring to FIGURE 11, there is seen the spur 16′ and a spur 106 branching off the main slot parallel to the spur 16′. The spurs 16′ and 106 are spaced by a distance D, which is such that trucks on one spur will not interfere with those on the adjacent spur. Also, a truck on the main slot 14 will not be required to push trucks into two spurs at the same time. It has been found that a suitable distance D can be computed by the following formula:

$$D \geq L + \frac{W}{2} + W(\cos \alpha)$$

where D is the distance in inches between the entrances to the spurs; L is the length of the deck of the truck, plus 2 inches; W is the width of the truck in inches; and α is the angle between the first spur segment and the main slot.

The above-described invention constitutes a substantial advance in the art in that it eliminates or greatly reduces the skidding problems which has heretofore affected conveyor systems. Moreover, the present invention realizes substantial savings due to reduced equipment wear, and results in quieter and safer operation than was had with systems heretofore known.

The present invention may be embodied in other specific forms without departing from the spirit or essential attributes thereof.

I claim:

1. In a material handling system comprising a floor having a main slot therein and a spur in communication with said main slot and extending away therefrom at an acute angle, a plurality of trucks having tow pins received in said slots, said trucks including surfaces at rear ends thereof adapted to be engaged by pushing means on other trucks, pushing means at the front end of the trucks constructed to apply a centrally located pushing force having a major component thereof normal to said surfaces, said pushing means being so arranged with respect to said tow pin as to avoid skidding of the trucks as it pushes a preceding truck into the spur, said pushing means comprising a central roller disposed for rotation about a generally vertical axis with a portion of said roller being the most forwardly projecting portion of said trucks, and the corners of said trucks at the front end being spaced rearwardly from a transverse line at the forward end of the roller so that said transverse line forms an angle of at least about 20° with a line from the corners to the forward end of said roller.

2. In a materials handling system in accordance with claim 1, said means disposed laterally and rearwardly from said central roller including a pair of side rollers defining forward edge portions of said truck.

3. In a materials handling system in accordance with claim 1, a shaft for said central roller, said roller being disposed for vertical sliding movement on said shaft, and means biasing said shaft to a forward position so that impact between said roller and the surface at the rear ends of preceding trucks is cushioned.

4. In a materials handling system in accordance with claim 1, said tow pin being disposed concentrically with said central roller.

5. In a materials handling system in accordance with claim 1, a second spur in communication with said main slot and extending away therefrom at an angle, said spurs being so spaced that a truck following the main slot can push preceding trucks into only one of the spurs at a given time.

6. In a materials handling system in accordance with claim 5, said spurs being parallel, and having their respective points of intersection with the main slot spaced by a distance D, where $$D \geq L + W/2 + W (\cos \alpha)$$

L being the length in inches of the trucks; W being the width of the trucks, also in inches; and α the angle at which the first segment extends away from the main slot.

7. In a materials hnadling system in accordance with claim 1, said spur comprising a segment in communication with and extending away from said main slot, said segment being of such length that the direction of the force applied by the pushing means of a truck to a preceding truck in the spur approximates the direction of said segment just before the pushing means becomes disengaged from surfaces.

8. In a material handling system in accordance with claim 7, said spur comprising first and second segments, a turn section joining said first and second segments, said segment in communication with said main slot being the first segment and of such length that the tow pin of a truck in the spur passes said turn section just before said pushing means becomes disengaged from the transversely extending portions, said second segment extending away from the main slot at an angle greater than the angle between the first segment and the main slot.

9. In a materials handling system in accordance with claim 8, said spur further including a third segment and a turn section joining said third segment to said second segment, said turn section between said first and second segments turning through a lesser angle than said turn section between said second and third segments.

10. In a materials handling system in accordance with claim 9, said first segment extending away from the main slot at an angle of about 45°, said second segment extending in a direction away from the direction of the first segment by an angle of about 15°, and said third segment extending in a direction away from the direction of the second segment by an angle of about 30°.

11. In a materials handling system in accordance with claim 7, said spur comprising first and second segments, a turn section joining said segments, said segment in communication with the main slot being said first segment and of such length that the tow pin of a truck entering said spur does not reach said turn section when said pushing means becomes disengaged from the transversely extending portions, said second segment being generally parallel to said main slot.

12. In a materials handling system in accordance with claim 11, said first segment diverging from said main slot at an angle whose tangent is about equal to the width of the truck divided by its overall length.

13. Material handling apparatus comprising a truck mounted on wheels, an upright tow pin on the front of the truck, said tow pin being of sufficient length to enter a guide slot for guiding movement of the truck, a centrally disposed push bumper on the front end of said truck, said push bumper being rotatable about an upright axis, the axes of said push bumper and tow pin lying along a center line of the truck, and further push bumper means, said further means comprising side rollers defining forward edge portions of the truck and spaced rearwardly from said centrally disposed push bumper at an angle of at least 20°.

14. Apparatus in accordance with claim 13, and said tow pin being concentric with said centrally disposed push bumper.

15. Apparatus in accordance with claim 13, and a shaft for said centrally disposed push bumper, said push bumper being disposed for vertical sliding movement on said shaft, and means biasing said shaft to a forward position so that impact between said roller and the surface at the rear end of a preceding truck is cushioned.

16. Apparatus in accordance with claim 13, and selector pin support means coupled to said tow pin so that raising of said tow pin causes raising of said selector pins.

17. Material handling apparatus comprising a truck mounted on wheels, an upright tow pin on the front of the truck, said tow pin being of a sufficient length to enter a guide slot disposed below the plane of the wheels for guiding movement of the trucks, means to prevent said truck from skidding about the longitudinal axis of said pin, said means including a centrally disposed push bumper on the front end of said truck, said push bumper being rotatable about an upright axis, said push bumper being the most forwardly projecting portion of said truck, said truck lacking any forwardly projecting structure which would intersect a line between the forward corners of the truck and said push bumper, and the axes of said push bumper and tow pin lying along a center line of the truck.

References Cited
UNITED STATES PATENTS

| | | | |
|---|---|---|---|
| 3,081,119 | 3/1963 | Dison | 293—48 |
| 3,094,944 | 6/1963 | Bradt | 104—172 |
| 3,139,840 | 7/1964 | Dehne | 104—172 |

DRAYTON E. HOFFMAN, Primary Examiner

U.S. Cl. X.R.

104—172